(12) United States Patent
Szepessy

(10) Patent No.: US 11,072,366 B2
(45) Date of Patent: Jul. 27, 2021

(54) METHOD FOR CONTROLLING A STEER-BY-WIRE STEERING SYSTEM WITH A REDUCED FEEDBACK IN AUTOMATIC DRIVE MODE

(71) Applicants: THYSSENKRUPP PRESTA AG, Eschen (LI); thyssenkrupp AG, Essen (DE)

(72) Inventor: Imre Szepessy, Mauren (LI)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 142 days.

(21) Appl. No.: 16/341,979

(22) PCT Filed: Oct. 31, 2016

(86) PCT No.: PCT/EP2016/076240
§ 371 (c)(1),
(2) Date: Apr. 15, 2019

(87) PCT Pub. No.: WO2018/077444
PCT Pub. Date: May 3, 2018

(65) Prior Publication Data
US 2019/0241213 A1     Aug. 8, 2019

(51) Int. Cl.
*B62D 6/00* (2006.01)
*B62D 5/00* (2006.01)
(Continued)

(52) U.S. Cl.
CPC .......... *B62D 6/008* (2013.01); *B62D 5/006* (2013.01); *B62D 5/043* (2013.01); *B62D 3/12* (2013.01)

(58) Field of Classification Search
CPC .......... B62D 3/12; B62D 5/006; B62D 5/043; B62D 6/008
See application file for complete search history.

(56) References Cited

U.S. PATENT DOCUMENTS 6,488,115 B1 * 12/2002 Ozsoylu ............... B62D 5/0427
180/402
8,364,347 B2 * 1/2013 Tsukasaki ................ B62D 7/15
701/41
(Continued)

FOREIGN PATENT DOCUMENTS

CN         1673006 A      9/2005
CN       101746412 A      6/2010
(Continued)

OTHER PUBLICATIONS

English Translation of International Search Report issued in PCT/EP2016/076240, dated Jul. 31, 2017.

*Primary Examiner* — Babar Sarwar
(74) *Attorney, Agent, or Firm* — thyssenkrupp North America, LLC

(57) ABSTRACT

A steer-by-wire steering system may include an actuation control system to actuate road wheels via a rack and pinion steering gear and a steering wheel control system to simulate a steering feel of a mechanically linked steering system to a steering device. The actuation control system may have a second control unit, and the steering wheel control system may have a first control unit and an actuator. An automatic driving electronic control unit may decide if a drive mode is vehicle-controlled or driver-controlled. If driver-controlled, the first control unit may rotate the steering wheel by a turning angle by activating the actuator according to a pre-set function depending on a rotation angle of a pinion to simulate the steering feel. If vehicle-controlled, the first control unit may rotate the steering wheel by a reduced turning angle by activating the actuator according to a fraction of the pre-set function.

16 Claims, 2 Drawing Sheets

(51) Int. Cl.
*B62D 5/04* (2006.01)
*B62D 3/12* (2006.01)

(56) References Cited

U.S. PATENT DOCUMENTS

| | | | | |
|---|---|---|---|---|
| 8,789,647 | B2* | 7/2014 | Hwang | F01B 3/007 |
| | | | | 180/444 |
| 9,079,604 | B2* | 7/2015 | Di Giusto | B62D 5/0421 |
| 2004/0088093 | A1* | 5/2004 | Yao | B62D 6/008 |
| | | | | 701/44 |
| 2005/0247510 | A1* | 11/2005 | Asano | B60T 8/1755 |
| | | | | 180/421 |
| 2013/0002416 | A1* | 1/2013 | Gazit | B62D 15/0255 |
| | | | | 340/438 |
| 2014/0277896 | A1* | 9/2014 | Lathrop | B62D 1/06 |
| | | | | 701/23 |
| 2017/0174258 | A1* | 6/2017 | Yamada | B62D 1/286 |
| 2019/0308662 | A1* | 10/2019 | Christiansen | B62D 1/10 |

FOREIGN PATENT DOCUMENTS

| | | | |
|---|---|---|---|
| CN | 203876816 U | | 10/2014 |
| DE | 10 2015 122 821 A | | 7/2016 |
| JP | 2004-224238 A | | 8/2004 |
| JP | 2004224238 A | * | 8/2004 |
| JP | 2006-264374 A | | 10/2006 |
| JP | 2012-040977 A | | 3/2012 |

* cited by examiner

METHOD FOR CONTROLLING A STEER-BY-WIRE STEERING SYSTEM WITH A REDUCED FEEDBACK IN AUTOMATIC DRIVE MODE

CROSS REFERENCE TO RELATED APPLICATION

This application is a U.S. National Stage Entry of International Patent Application Ser. No. PCT/EP2016/076240, filed Oct. 31, 2016, the entire content of which is incorporated herein by reference.

FIELD The present disclosure generally relates to steering systems, including methods for controlling steer-by-wire steering systems in vehicles.

BACKGROUND

In conventional vehicle steering systems, such as manual or power steering systems, the steering wheel is mechanically coupled to the road wheels by a particular mechanism, such as a rack and pinion subsystem. By definition, a steer-by-wire system has no mechanical link connecting the steering wheel from the road wheels. The direction handling commands are communicated from the steering wheel to the road wheels using electric signals. The road wheels are actuated using an electric motor-based actuation control system. The steering feel of a conventional mechanically linked steering system is simulated using an electric motor-based steering wheel control system. This electric motor-based steering wheel control system is referred to as the artificial steering feel control system or the steering wheel control system.

Steer-by-wire systems can have half-automated driving incorporated, which allows the driver to change between an automatic drive (AD) mode where no input from the driver is necessary to realize the movement of the road wheels and a manual drive (MD) mode, where the driver moves the steering wheel and based on this information the actuation control system moves the road wheels. One problematic issue of half-automated driving is that the steering wheel rotates vigorously while the vehicle is in automatic mode. This can be distracting and cause confusion for the driver. Further a moving steering wheel following the rack movement can seriously injure the driver e.g. when he gets his hand into the steering wheel during a more dynamic manoeuvre.

It is possible to use a clutch to separate the movement of the steering wheel from the movement of the road wheels, which results in a stand still of the steering wheel if the clutch is disengaged. However this might be uncomfortable for the driver as he does not get any feedback of what is happening at the road wheels side. Another issue is the transition from vehicle controlled steering (automatic mode) to driver controlled steering (manual mode), which can lead to a big offset between the steering wheel and the road wheels.

Thus a need exists for an improved method and system for controlling steer-by-wire steering systems of motor vehicles during automatic steering procedures.

DETAILED DESCRIPTION

Figure 1:
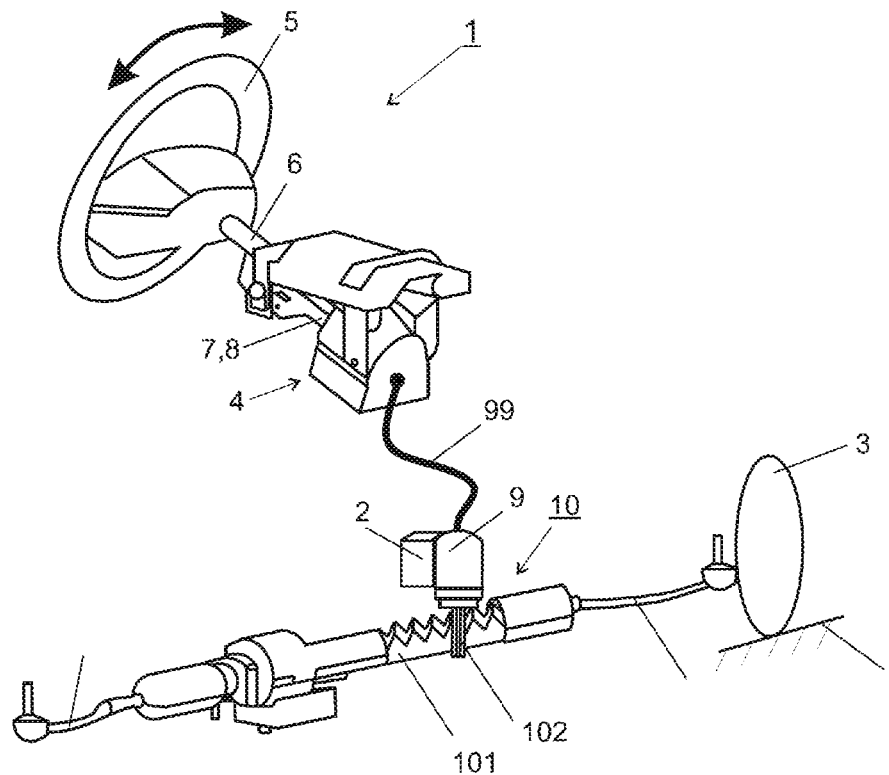
FIG. 1 is a schematic view of an example steer-by-wire steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Accordingly, a method for controlling a steer-by-wire steering system for a motorized vehicle, the steer-by-wire steering system comprising an actuation control system to actuate road wheels via a rack and pinion steering gear and a steering device control system to simulate a steering feel of a mechanically linked steering system on a steering device is provided, the actuation control system having a second control unit and an actuator and the steering device control system having a first control unit, the steer-by-wire steering system comprising further of an automatic driving electronic control unit that decides based on input signals if a vehicle controlled steering, which is in the following equated with an automatic drive mode, or a driver controlled steering, which is in the following equated with a manual drive mode, is present, wherein the following steps are provided:

Detecting the current status of the drive mode and reporting of the current status to the first control unit using the automatic driving electronic control unit;

If a manual drive mode status is received by the first control unit, rotation of the steering device around a steering device turning angle by activation of the actuator of the steering device control system according to a pre-set function depending on a rotation angle of the pinion being part of the rack and pinion steering gear to simulate a steering feel of a mechanically linked steering system;

If an automatic drive mode status is received by the first control unit, rotation of the steering device around a reduced steering device turning angle by activation of the actuator of the steering device control system according to the pre-set function multiplied by a factor less than one.

This way, it is possible during automatic drive mode to reduce the movement of the steering device, so that the driver feel less discomfort during driving, while guaranteeing the independence of the movement of the road wheels.

The factor can be a function with at least one variable. The factor can be linear or dependent on the steering device turning angle and/or the steering device turning acceleration and/or the vehicle speed and/or the yaw rate of the vehicle or further driving parameters of the vehicle.

In preferred embodiment in automatic drive mode the steering device angle speed is reduced in comparison to a steering device angle speed in manual drive mode.

Further it is advantageously, if in automatic drive mode the steering device turning torque is set to a pre-defined value. This pre-defined value is preferably a minimum value of an operating range used in manual drive mode.

Preferably, the steer-by-wire steering system further comprises a hands-on-off detection which provides an input signal for the automatic driving electronic control unit.

It is preferred, if the factor has a value between 0 and 0.99 to ensure that the automatic drive mode is in the range between a vehicle low speed and a vehicle high speed. It is further preferred that the factor has a value between 0 and 0.5, in particular between 0 and 0.25.

If a feedback of the steering action at the steering wheel side in automatic drive mode is not desired the factor can be set to zero. Therefore the second control unit transmits no movement information of the steering device to the first control unit device, so the steering device movement is electronically decoupled from the movement of the road wheels. In that case the steering device does not turn.

Further a steer-by-wire steering system for a motorized vehicle comprising an actuation control system to actuate road wheels via a rack and pinion steering gear and a steering wheel control system to simulate a steering feel of a mechanically linked steering system is provided, the actuation control system having a second control unit and an actuator and the steering device control system having a first control unit, the steer-by-wire steering system comprising further of an automatic driving electronic control unit that decides based on input signals if a vehicle controlled steering, which is in the following equated with an automatic drive mode, or a driver controlled steering, which is in the following equated with a manual drive mode, is present, wherein the automatic driving electronic control unit is designed to report the current status of the drive mode to the first control unit, which is designed, being in manual drive mode, to activate the actuator of the steering device control system according to a pre-set function depending on a rotation angle of the pinion being part of the rack and pinion steering gear to rotate the steering device around a steering device turning angle to simulate a steering feel of a mechanically linked steering system and which is further designed, being in automatic drive mode, to activate the actuator of the steering device control system according to a pre-set function multiplied by a factor less than one to rotate the steering device around a reduced steering device turning angle.

Preferably, the steer-by-wire steering system further comprises a hands-on-off detection which provides an input signal for the automatic driving electronic control unit.

If a feedback of the steering action at the steering wheel side in automatic drive mode is not desired, the the steer-by-wire steering system can further comprise an electronic clutch arrangement, which is designed to completely decouple the steering device movement from the movement of the road wheels.

FIG. 1 is a schematic representation of a steer-by-wire steering system 1 that comprises an actuation control system 2 to actuate road wheels 3 and a steering device control system 4 to simulate the steering feel of a conventional mechanically linked steering system. A steering device 5, which is in the example a steering wheel but which can also be a joystick, is connected to a driver input shaft 6. Position sensors 7 and torque sensor 8 are operably connected to driver input shaft 6. Position sensors 7 electronically detect the angular position of the driver input shaft 6, while the torque sensor 8 electronically detects and evaluates the torsional force acting on the driver input shaft 6. The angular displacement of the steering wheel 5 is detected, transmitted to the actuation control system 2 via a signal line 99, processed in the actuation control system 2, and applied to a servo motor 9 to move the steerable road wheels 3 via a rack 101 and pinion 102 system 10 in a defined angle β.

Figure 2:
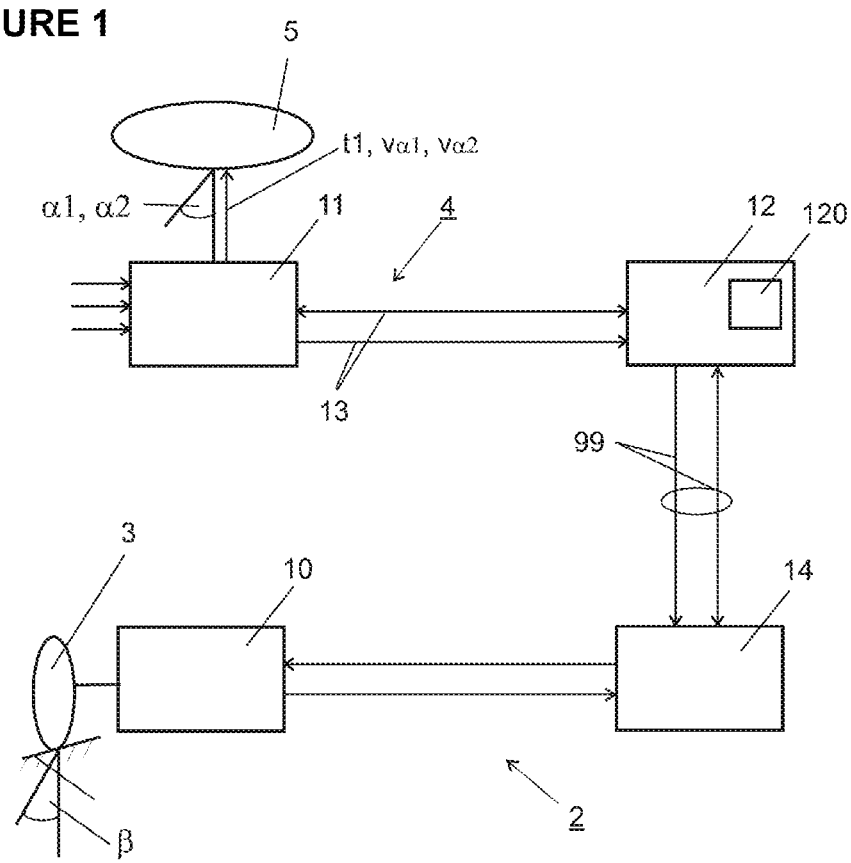
FIG. 2 is a schematic view of an example steer-by-wire steering system with control and signal lines from a steering wheel control system to a steering gear.

As shown in FIG. 2, the steering device control system 4 includes a steering device actuator 11 to provide a passive steering system feel similar to current production hydraulic or electric assisted rack and pinion systems to the steering wheel 5. The steering device actuator 11 includes an electric motor having a motor shaft rotatively driven by the motor and connected to the driver input shaft 6. Within the steering device control system 4 the steering device actuator 11 electronically communicates with a first control unit 12 via control and signal lines 13. The first control unit 12 communicates via the signal lines 99 electronically the values detected by the sensors 7, 8 to a second control unit 14 being part of the actuation control system 2. The actuation control system 2 further comprises an actuator 9 assigned to the steering gear 10 to move the steerable road wheels 3. The second control unit 14 receives signals from the first control unit 12 and gives feedback of road wheel 3 movement to the first control unit 12.

Since there is no direct mechanical coupling between the actuation control system 2 and the steerable wheels 3, the driver does not receive any feedback from the road surface through the steering mechanism. Therefore, the steering device actuator 11 generates a reaction torque to the steering wheel 5, based upon a number of steering parameters such as vehicle speed, steering device angle α1, the steering device angle speed vα1, vα2, the steering device turning acceleration, the yaw rate of the vehicle, road surface condition, and further driving parameters of the vehicle.

The steer-by-wire system of FIGS. 1 and 2 has half-automated driving incorporated, which allows a transition from vehicle controlled steering (automatic drive mode) to driver controlled steering (manual drive mode).

An automatic driving electronic control unit (ECU) 120 is present which sets the current drive mode and adjusts the steering system accordingly. The autonomous driving electronic control unit 120 decides based on input signals from the first 12 and second control unit 14 which steering mode is needed. A hands-on-off detection can for example be one of the input signals. The detection of whether there is contact between the driver's hands and the steering wheel (referred to as "hands-on-off" detection for short) can be made when the driver carries out active steering movements or when the driver wants to override automatic steering and take control of the vehicle, grasping the steering wheel is one way for the driver to commandeer control of the vehicle. In addition, the steering wheel 5 can be the means to transfer control of the vehicle to an automatic steering system.

Hands-on-off detection can be carried out by the steering angle and torque sensors 7, 8.

When the steering system 1 is in manual drive mode. The steering wheel 5 communicates directly with the road wheels 3 and the actuator 9 of the steering wheel control system 11 gives an artificial feedback to the driver.

When the steering system changes to automatic drive mode, the automatic driving electronic control unit 120 provides instructions to the first control unit 12 which receives signals 99 from the second control unit 14 and provides information to the actuator 9 of the steering wheel control system 11 for generating an artificial reduced visual steering wheel 5 movement.

In automatic drive mode the steering device angle α2 and/or steering device angle speed vα1 (road wheel to steering wheel transmission) is reduced in comparison to a steering device turning angle α1 and/or a steering device angle speed vα2. The visual feedback movement of the steering wheel 5 is decoupled of the actual rack 101 movement and is controlled by the first control unit 12 in such a way that only slow and small movements are generated without disturbing the driver. This way the offset between the steering wheel 5 and the road wheel 3 is reduced with respect to complete uncoupling of the road wheel 3 to steering wheel 5 transmission. When returning to manual drive mode, the angle difference between the current position of the steering wheel and the position of the steering wheel according to the current position of the road wheels is thus smaller. In another embodiment it is advantageous to further limit the torque t1 applied by the steering wheel actuator 9 to the steering wheel 5 to increase the safety of the driver.

Figure 3:
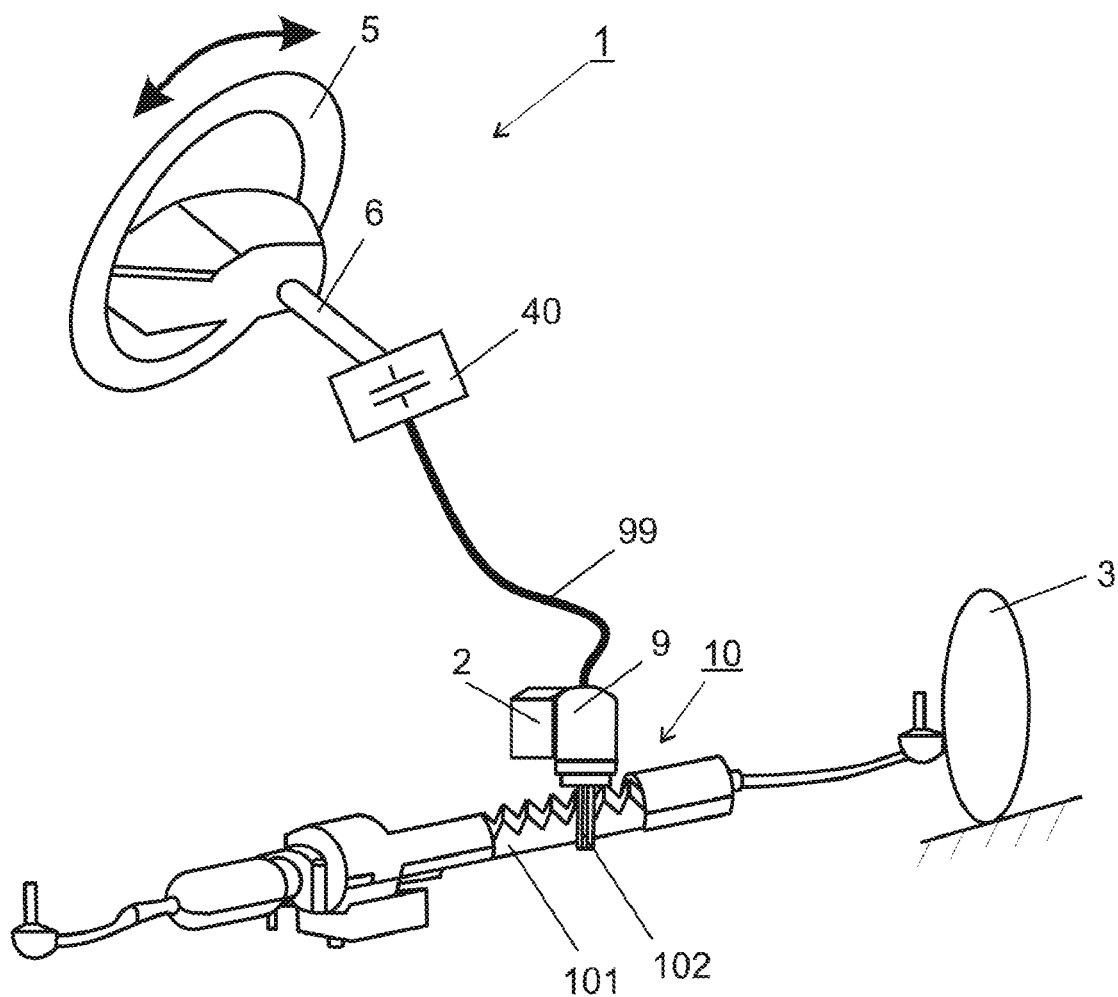
FIG. 3 is a schematic view of an example steer-by-wire steering system with an electronic clutch arranged between a steering wheel and a steering gear.

It is further possible to completely decouple the steering wheel movement from the movement of the road wheels electronically, so the second control unit 14 sends no movement signals to the first control unit 12, or by an electronic clutch arrangement 40, as shown in FIG. 3, so that the steering wheel actuator 9 does not execute any movement of the steering wheel 5 during automatic drive mode.

What is claimed is:

1. A method for controlling a steer-by-wire steering system for a motorized vehicle, the steer-by-wire steering system comprising a steering device control system for simulating a steering feel to a steering device, with the steering device control system including a first control unit; an actuation control system for actuating road wheels via a rack and pinion steering gear, with the actuation control system including a second control unit and an actuator; and an automatic driving electronic control unit for deciding based on input signals if a drive mode corresponds to a vehicle-controlled steering mode or a driver-controlled steering mode, the method comprising:
   detecting a status of the drive mode; and
   reporting the status to the first control unit via the automatic driving electronic control unit,
   wherein if the drive mode reported to the first control unit corresponds to the driver-controlled steering mode, the method comprises rotating the steering device by a first steering device turning angle by activating the actuator according to a pre-set function depending on a rotation angle of a pinion of the rack and pinion steering gear to simulate the steering feel,
   wherein if the drive mode reported to the first control unit corresponds to the vehicle-controlled steering mode, the method comprises rotating the steering device by a second steering device turning angle by activating the actuator according to the pre-set function multiplied by a factor of less than one, wherein the factor is a function with at least one variable.

2. The method of claim 1 wherein the factor is linear.

3. The method of claim 1 wherein the factor is dependent on the first steering device turning angle or the second steering device turning angle.

4. The method of claim 1 wherein the second steering device turning angle is less than the first steering device turning angle.

5. The method of claim 1 wherein the second steering device turning angle in the vehicle-controlled steering mode is reduced relative to the first steering device turning angle in the driver-controlled steering mode.

6. The method of claim 1 wherein under the vehicle-controlled steering mode the method comprises setting a steering device turning torque to a predefined value.

7. The method of claim 1 wherein the steer-by-wire steering system comprises hands-on-off detection that provides one of the input signals for the automatic driving electronic control unit.

8. The method of claim 1 comprising providing an indication as to whether a driver's hand or hands are touching the steering device as one of the input signals for the automatic driving electronic control unit.

9. The method of claim 1 wherein the factor has a value between 0 and 0.5.

10. The method of claim 1 wherein the factor has a value between 0 and 0.25.

11. The method of claim 1 wherein the factor is 0.

12. A steer-by-wire steering system for a motorized vehicle comprising:
    a steering device control system for simulating a steering feel to a steering device, with the steering device control system including a first control unit;
    an actuation control system for actuating road wheels via a rack and pinion steering gear, with the actuation control system including a second control unit and an actuator; and
    an automatic driving electronic control unit for deciding based on input signals if a drive mode corresponds to a vehicle-controlled steering mode or a driver-controlled steering mode, wherein the automatic driving electronic control unit is configured to report a status of the drive mode to the first control unit,
    wherein under the driver-controlled steering mode the first control unit is configured to activate the actuator according to a pre-set function depending on a rotation angle of a pinion of the rack and pinion steering gear to rotate the steering device by a first steering device turning angle to simulate the steering feel,
    wherein under the vehicle-controlled steering mode the first control unit is configured to activate the actuator according to the pre-set function multiplied by a factor of less than one to rotate the steering device by a second steering device turning angle, wherein the factor is a function with at least one variable.

13. The steer-by-wire steering system of claim 12 wherein the second steering device turning angle is less than the first steering device turning angle.

14. The steer-by-wire steering system of claim 12 wherein the second steering device turning angle in the vehicle-controlled steering mode is reduced relative to the first steering device turning angle in the driver-controlled steering mode.

15. The steer-by-wire steering system of claim 12 comprising means for detecting whether a driver's hand or hands are contacting the steering device, which is used as one of the input signals for the automatic driving electronic control unit.

16. The steer-by-wire steering system of claim 12 comprising an electronic clutch arrangement configured to decouple movement of the steering device from movement of the road wheels.

* * * * *